US006979109B2

(12) United States Patent
Burton

(10) Patent No.: US 6,979,109 B2
(45) Date of Patent: Dec. 27, 2005

(54) SLIDING ADJUSTER

(75) Inventor: John E. Burton, Ludington, MI (US)

(73) Assignee: Burton Technologies LLC, Ludington, MI (US)

(*) Notice: Subject to any disclaimer, the term of this patent is extended or adjusted under 35 U.S.C. 154(b) by 0 days.

(21) Appl. No.: 10/925,886

(22) Filed: Aug. 25, 2004

(65) Prior Publication Data
US 2005/0083707 A1 Apr. 21, 2005

Related U.S. Application Data

(63) Continuation of application No. 10/224,612, filed on Aug. 20, 2002, now Pat. No. 6,913,374, which is a continuation of application No. 09/504,250, filed on Feb. 15, 2000, now Pat. No. 6,474,850.

(51) Int. Cl.[7] .............................................. G01B 21/22
(52) U.S. Cl. ...................... 362/460; 362/463; 362/528; 362/524; 362/424; 362/515
(58) Field of Search ................................ 362/463, 460, 362/528, 524, 424, 421, 515; 74/89.33

(56) References Cited

U.S. PATENT DOCUMENTS

| 417,516 | A | 12/1889 | Shawhan |
|---|---|---|---|
| 4,309,740 | A | 1/1982 | Takata |
| 4,674,018 | A | 6/1987 | Ryder et al. |
| 4,737,891 | A | 4/1988 | Burton |
| 4,922,387 | A | 5/1990 | Ryder et al. |
| 4,939,945 | A | 7/1990 | Ryder et al. |
| 4,965,706 | A | 10/1990 | Reiland |
| 4,970,629 | A | 11/1990 | McMahan |
| 5,186,532 | A | 2/1993 | Ryder et al. |
| 5,214,971 | A | 6/1993 | Burton |
| 5,251,114 | A | 10/1993 | Cantin et al. |
| 5,343,372 | A | 8/1994 | Shirai et al. |
| 5,355,287 | A | 10/1994 | Denley |
| 5,390,089 | A | 2/1995 | Denley |
| 5,390,098 | A | 2/1995 | Reiland |
| 5,488,546 | A | 1/1996 | Sato et al. |
| 5,526,238 | A | 6/1996 | Van Oel et al. |
| 5,539,625 | A | 7/1996 | Turley, Jr. et al. |

(Continued)

OTHER PUBLICATIONS

Photographs and part drawings of adjuster used in a 1999 Mercury Cougar vehicle.

Primary Examiner—John Anthony Ward
Assistant Examiner—Jacob Y. Choi
(74) Attorney, Agent, or Firm—Brian G. Gilpin; Godfrey & Kahn, S.C.

(57) ABSTRACT

A sliding adjuster includes a base housing with a slide positioned at least partially therein. The base housing includes mounting tabs so that the adjuster can be secured to the back of a headlamp assembly support frame. The base housing includes channels along its sides in which rails extending from the slide are disposed. A ball stud extends from the slide, the ball of which is engaged in a reflector within the headlamp assembly such that axial movement of the ball stud causes movement of the reflector. Movement of the slide is caused by rotation of an adjustment screw that is threaded into the slide but held in axial position with respect to the base housing. The adjuster may include a vehicle headlamp aiming device ("VHAD") if required for the particular application.

14 Claims, 9 Drawing Sheets

U.S. PATENT DOCUMENTS

| | | |
|---|---|---|
| 5,642,935 A | 7/1997 | Schmitt |
| 5,669,695 A | 9/1997 | Parker et al. |
| 5,707,133 A | 1/1998 | Burton |
| 5,735,656 A | 4/1998 | Marvell et al. |
| 5,762,415 A | 6/1998 | Tolley |
| 5,775,795 A | 7/1998 | Christian et al. |
| 5,897,202 A | 4/1999 | Denley |
| 5,906,431 A | 5/1999 | Chianale et al. |
| 5,971,574 A | 10/1999 | Taniuchi |
| 5,993,032 A | 11/1999 | Herbers |
| 6,050,712 A | 4/2000 | Burton |
| 6,257,747 B1 | 7/2001 | Burton |
| 6,568,837 B2 | 10/2001 | Denley |
| 6,474,850 B1 | 11/2002 | Burton |

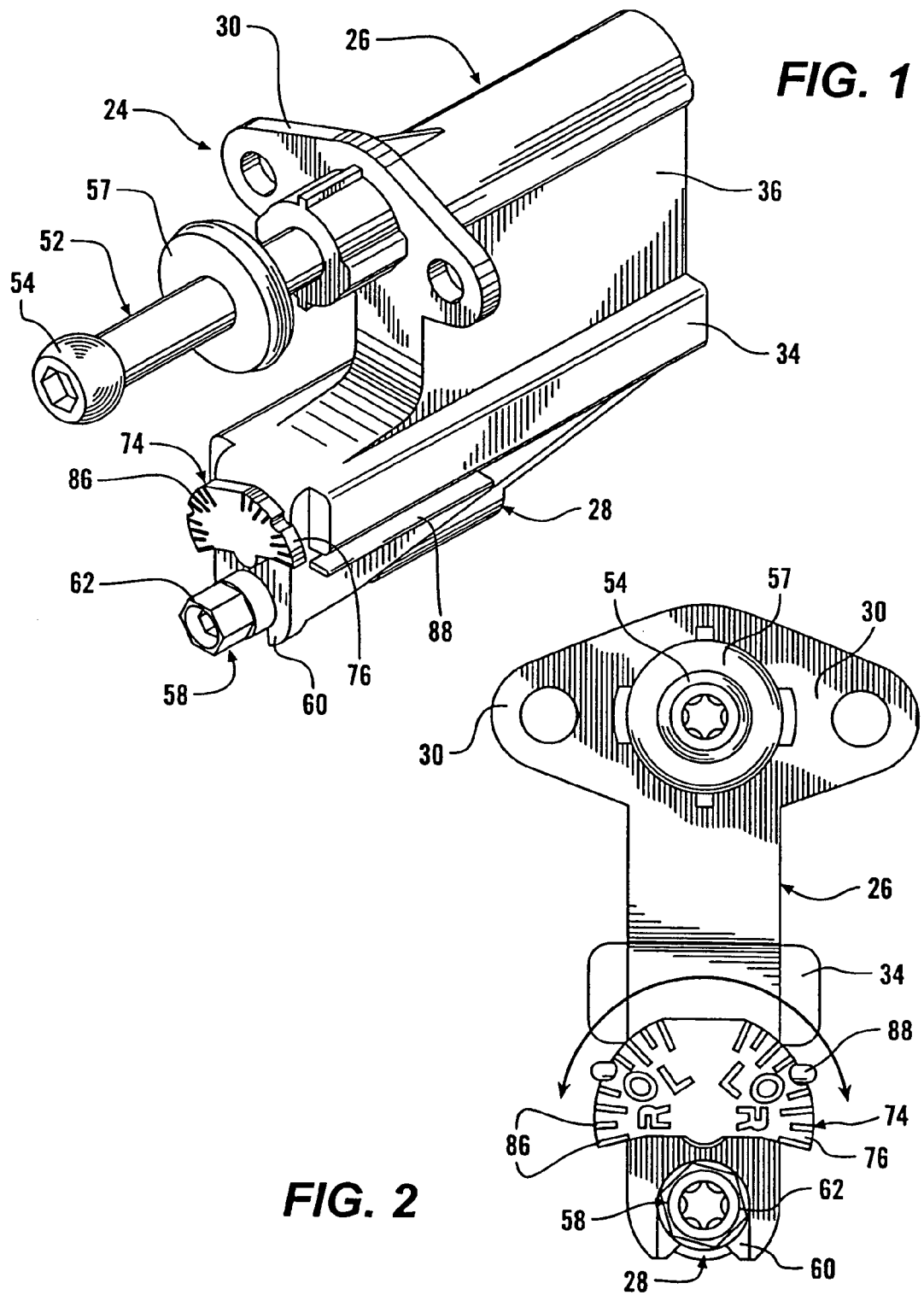

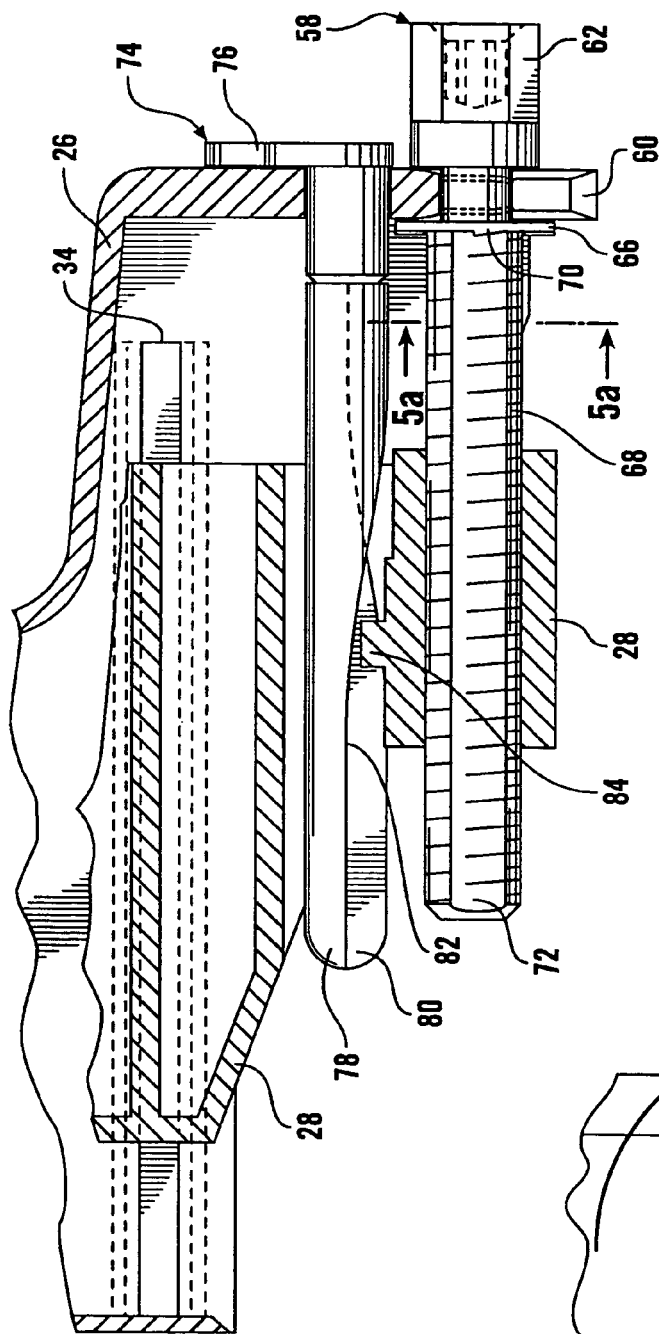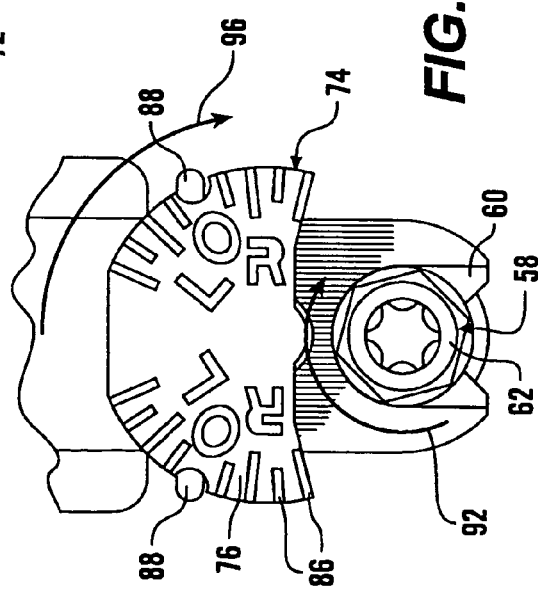

SLIDING ADJUSTER

PRIORITY CLAIM/CROSS REFERENCE

This is a continuation application of U.S. patent application Ser. No. 10/224,612 filed Aug. 20, 2002, now U.S. Pat. No. 6,913,374 issued Jul. 5, 2005, which is a continuation of U.S. patent application Ser. No. 09/504,250 file date Feb. 15, 2000, now U.S. Pat. No. 6,474,850 issued Nov. 5, 2002, which are hereby incorporated in their entireties for all purposes.

FIELD OF THE INVENTION

This invention relates generally to adjuster mechanisms, and more particularly to a sliding headlamp adjuster mechanism for use in motor vehicles.

BACKGROUND OF THE INVENTION

In traditional sealed beam style headlamps, the lamp's aim is adjusted by rotating one or more screws that hold the frame of the lamp to the vehicle. Such adjustment is made from the front of the vehicle by inserting a screwdriver or the like between the lamp frame and the vehicle trim and turning the screws to alter the orientation of the lamp and effectuate the desired adjustment. As the design of motor vehicles has evolved, headlamps have continually been reconfigured to improve the aerodynamics and styling of the front end of the vehicle. Modem headlamps are designed so that their lenses follow the contour of the vehicle to provide an aerodynamically efficient exterior surface. Adjustment of these headlamps must still be performed in order to provide an optimal beam of light and to prevent the aiming of light beams toward oncoming vehicles. Such adjustment is made by moving a reflector within the lamp assembly so that light is directed in the desired manner. Automotive manufacturers' demand for aerodynamically efficient headlamp designs has lead to modular designs where the headlamp adjustment mechanism is located within the interior of the engine compartment and positioned such that adjustment can be easily performed without removing any trim pieces. Thus, the constraints of the installation area and the demands of the automobile manufacturers for aerodynamic headlamp designs dictate the location from which adjustment must be made.

There are many adjuster devices designed for use in connection with aerodynamic headlight designs including, among others, the devices disclosed in U.S. Pat. Nos. 5,707,133 and 5,214,971 to Burton, the inventor of the present invention. Modem automotive headlamp assemblies typically include several basic parts: a support frame, a reflector, a lens, a bulb, and one or more adjusters. The support frame houses the reflector and the bulb on a pivotable mounting to allow the aim of the light to be adjusted using the adjusters and provides a mounting surface for attaching adjusters. The lens seals the front of the support frame to protect it from the elements assailing the front end of the vehicle and provides an aerodynamic shape and attractive appearance. The reflector mounts on one fixed ball joint and is adjustable horizontally and vertically using adjusters that interface with the reflector through moving ball joints. The moving ball joints are moved by actuating the adjusters connected to the moving ball joints by a ball stud. Geared angle style adjusters, such as the ones disclosed in the referenced Burton patents, are often used to adjust the aim of the headlamp. However, such devices are designed to allow adjustment of the headlamp from a location behind the assembly, typically from within the engine compartment and immediately behind and above the lamp assembly. Accordingly, such devices cannot be effectively used in vehicles where the area immediately behind and above the lamp assembly is not accessible. One such vehicle design is shown in FIG. 14. In that design, the vehicle fender 20 covers the headlamp assembly 22 rendering the area behind and above the assembly substantially inaccessible without removal of the fender 20 of the vehicle. The area below the headlamp assembly 22 is similarly inaccessible because of the bumper 21 and other vehicle components. Thus, existing geared angle style headlamp adjusters have not been found to be effective for use in such vehicle designs.

Conventionally in a vehicle such as the one shown in FIG. 14, a sealed beam style headlamp is used. However, due to consumer and vehicle manufacturer styling preferences and performance objectives, it is desirable to use a reflector style headlamp in such vehicles. The conventional method for adjusting sealed beam lamps cannot be used to adjust a reflector style lamp and the area immediately above and behind the lamp is inaccessible such that a conventional geared angle style adjuster cannot be used. Accordingly, a need exists for a headlamp adjuster which can be used in connection with a vehicle design where the area behind and above the lamp assembly is substantially inaccessible and the use of a reflector style lamp is desired.

SUMMARY OF THE INVENTION

The present invention relates to a sliding headlamp adjuster that allows for precise adjustment control, can be used where the area above and behind the lamp assembly is inaccessible, ensures smooth operation, can include a vehicle headlamp aiming device ("VHAD"), is cost effective, and which solves the problems raised or not solved by existing headlamp adjuster designs. As described in more detail below and shown in the accompanying drawings, the sliding headlamp adjuster uses a two-piece sliding body construction to meet these objectives.

A headlamp adjuster in accordance with one embodiment of the present invention includes a base housing with a slide disposed at least partially therein. The base housing includes one or more mounting tabs such that the adjuster can be mounted to the back of a headlamp assembly support frame. The base housing has channels along its sides in which rails extending from the slide are disposed. A ball stud is threaded into the slide and protrudes therefrom passing through the base housing into the headlamp assembly. The ball of the ball stud is engaged in a socket in the reflector so that axial movement of the ball stud causes movement of the reflector. The ball stud is caused to axially move by a corresponding sliding of the slide along the channels in the base. Movement of the slide results from rotation of an adjustment screw that is threaded into the sliding piece but held in axial position (free to rotate) in the base. Thus, rotation of the axially-fixed adjustment screw causes movement of the slide and the ball stud with respect to the base housing. Because the base is fixed to the headlamp assembly support frame and the ball is engaged in a socket in the reflector, rotation of the adjusting screw causes changes in the orientation of the reflector within the assembly and the aim of the lamp is thereby adjusted.

In certain applications, the adjuster must include a VHAD. U.S. National Highway Traffic Safety Administration ("NHTSA") standards require that horizontal adjuster mechanisms be either non-readjustable after the proper aim has been achieved or be equipped with a non-recalibratable VHAD. Currently, VHADs are required for horizontal adjusters but not for vertical adjusters. The VHAD used in the sliding adjuster includes an indicator plate with a post extending therefrom. The post includes a groove with a partial helical twist and is axially fixed (free to rotate) with respect to the base housing. A tab jutting from the slide is disposed in the groove. The indicator plate is positioned on the base near the adjustment screw such that indicator lines on the plate can be seen by the person adjusting the aim of the lamp. The base includes aiming rails behind the plate that, in connection with the indicator lines, allow the person making the adjustment to perceive how much of an adjustment has been made. Because the groove includes a partial helical twist, as the tab jutting from the slide moves along the groove with movement of the slide, the post and indicator plate are caused to rotate. The scale of the movement of the plate as reflected in the indicator lines is designed to reflect the corresponding movement of the reflector. If no VHAD is required, the indicator plate and post are simply not installed in the sliding adjuster.

The new design has numerous benefits that make it advantageous for use in connection with reflector style headlamps. The new design allows precise control of reflector aim, has smooth operational characteristics, can include a VHAD, and effectively maintains adjustment. Further, the new adjuster can be used where the area above and behind the lamp is inaccessible and it is cost effective to manufacture and install.

While the present invention is particularly useful in automotive headlamp assemblies, other applications are certainly possible and references herein to use in a headlamp assembly should not be deemed to limit the application of the present invention. Rather, the present invention may be advantageously adapted for use where similar performance capabilities and characteristics are desired. These and other objects and advantages of the present invention will become apparent from the detailed description, claims, and accompanying drawings.

BRIEF DESCRIPTION OF THE DRAWINGS

FIG. 1 is a perspective view of a sliding headlamp adjuster constructed in accordance with one embodiment of the present invention;

FIG. 2 is a front view of a sliding headlamp adjuster constructed in accordance with one embodiment of the present invention;

FIG. 5a is cross-sectional view of the adjustment screw shown in FIG. 6 taken generally along the line 5a–5a;

FIG. 6 is a partial cross-section of the sliding headlamp adjuster in FIG. 3 taken generally along the line 6—6;

FIG. 7 is a partial front view of a sliding headlamp adjuster in accordance with one embodiment of the present invention wherein the adjustment screw is being rotated in the direction of arrow 92 resulting in movement of the VHAD indicator plate in the direction of arrow 96;

DETAILED DESCRIPTION

Figure 3:
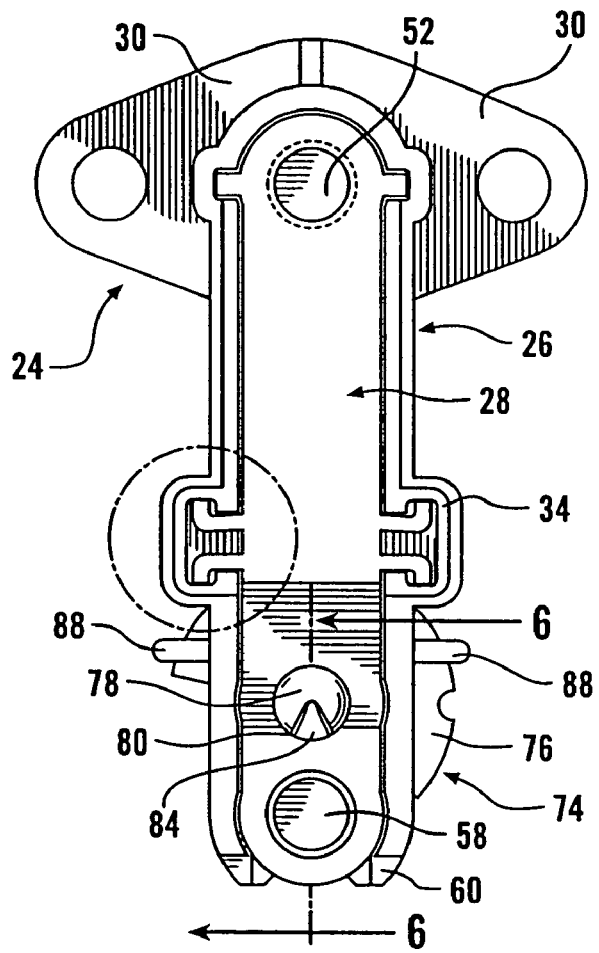
FIG. 3 is a rear view of a sliding headlamp adjuster constructed in accordance with one embodiment of the present invention.

As shown in FIGS. 1 and 2, a sliding headlamp adjuster (identified generally as 24) in accordance with one embodiment of the present invention includes a base housing 26 with a slide 28 disposed at least partially therein. The base housing 28 has one or more mounting tabs 30 such that the adjuster 24 can be mounted to the back of a headlamp assembly support frame 32 (see FIG. 11). The amount and configuration of the tabs 30 can be configured as necessary for particular installations. Alternatively, a quarter-turn mounting system could be used. The base housing 26 has interior channels 34 running along its sides 36. When viewed from the exterior, e.g., FIG. 1, the channels 34 appear rectangular in cross-section. However, as shown in FIG. 3 and in detail in FIG. 4, on the interior, the channels 34 have a generally sideways T-shaped open cross section with a top T portion 38, a bottom T portion 40 and a narrower neck T portion 42.

Figure 4:
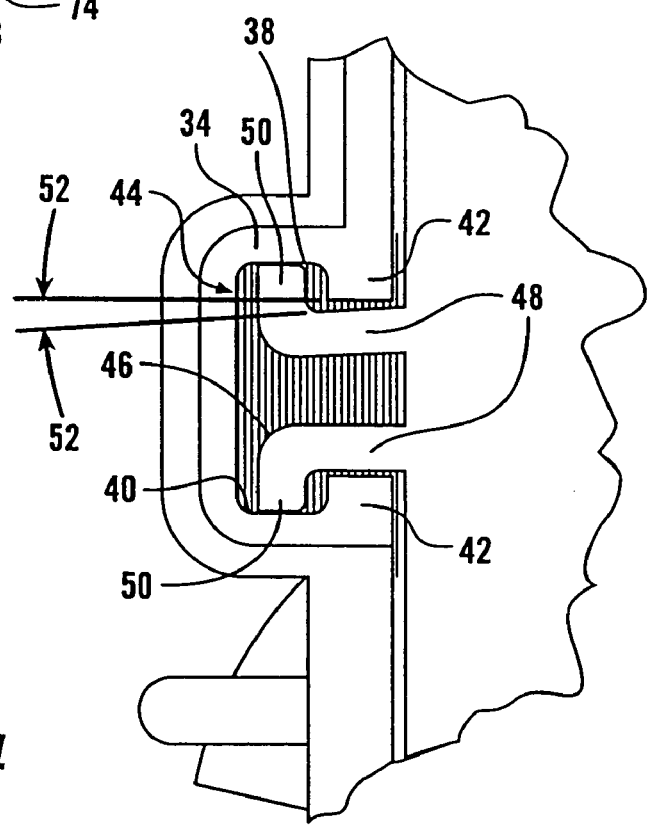
FIG. 4 is a section detail of the rear view of a sliding headlamp adjuster constructed in accordance with the embodiment of the present invention shown in FIG. 3.
Figure 8:
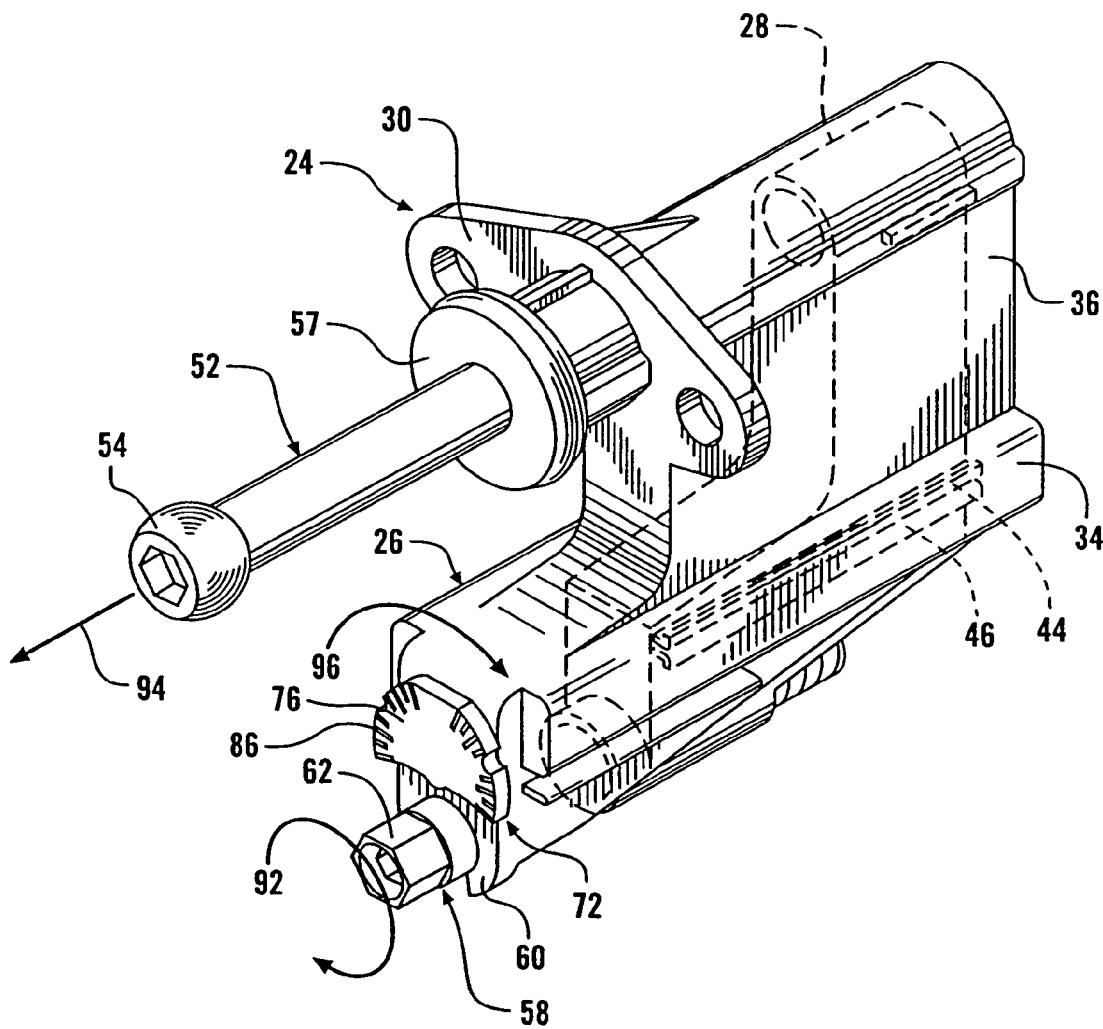
FIG. 8 is a perspective view of a sliding headlamp adjuster in accordance with one embodiment of the present invention with the adjustment screw being rotated in the direction of arrow 92 resulting on movement of the VHAD indicator plate in the direction of arrow 96 and the ball stud in the direction of arrow 94.

As shown in FIGS. 3 and 4, the slide 28 has rails extending from each of its sides. The rails include an upper rail 44 and a lower rail 46. Each rail includes a leg 48 with a foot 50 extending therefrom. The rails 44 and 46 are disposed within the channels 34 so as to allow the slide 28 to move with respect to the base housing 26. As shown in FIG. 8, rails 44 and 46 extend along the side(s) of the slide and provide ample length of engagement to allow a smooth sliding movement and to resist binding. As shown in FIG. 4, the leg 48 of the lower rail 46 interfaces with the neck portion 42 of the channel 34. Because this interface is relatively near to the base of the leg 48, there is little flex of the leg 48. The foot 50 of upper rail 44 interfaces with the top T portion 38 of the channel 34 such that the leg 48 is flexed at an angle as indicated by arrows 52 which reflect the difference from straight of the leg 48. The continually flexed engagement of the upper rail 44 with the channel 34 helps reduce any "play" or "slop" in the operation of the adjuster 24, reduces problematic headlamp "flutter" (flutter is the apparent flickering of a headlamp caused by an improperly secured headlamp that moves when a vehicle hits a bump), and maintains the adjuster 24 in the desired adjustment. This resistance to "flutter" is typically tested by applying a set force to the ball stud 52 in the opposite direction of arrow 94 as shown in FIG. 8 while measuring the resulting deflection of the ball stud 52 in the same direction. In this test, deflection of the ball stud 52 is resisted primarily by the rigidity of the slide 28, the slide rail 44 and housing channel 34 connection described, and the connection points of adjustment screw 58. The rail and channel connection is subjected to a bending moment when the test load is applied urging the slide to rock in the rail channel. Minimizing rocking of the slide in the rail channel area as a result of this bending moment minimizes deflection of the ball stud 52. Since the leg 48 in the lower rail 46 resists flex, a greater resistance to rocking and hence to deflection is achieved. While this configuration for the engagement between the rails 44 and 46 and the channels 34 has been found effective, alternative configurations could also be effective. Similarly, while it has been found effective to have two rail/channel engagements, one on each side of the base housing 26 and slide 28, other numbers and configurations could be used. For example, if additional stability is desired, an additional rail/channel could be provided.

Figure 11:
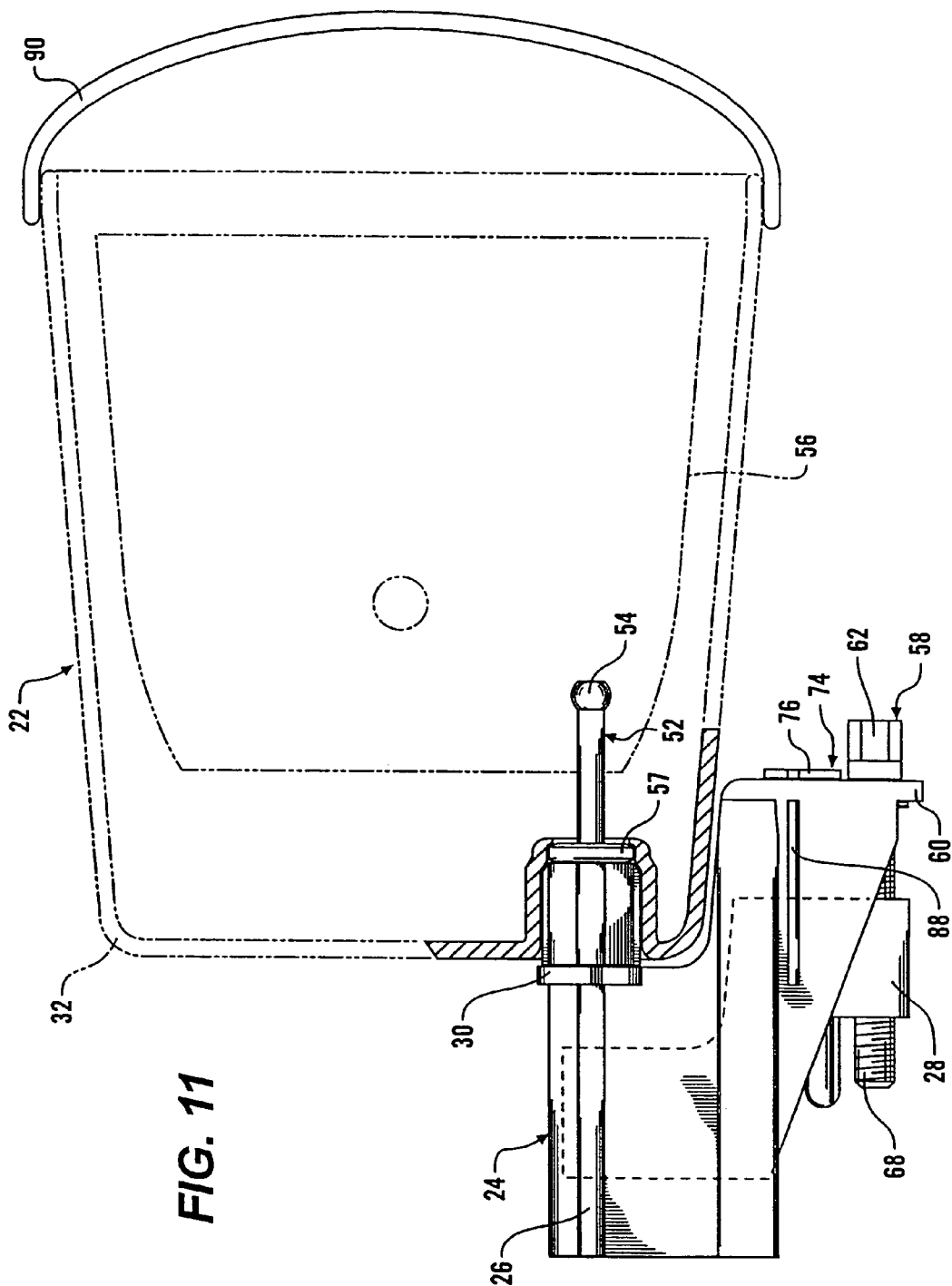
FIG. 11 is a side view of a sliding headlamp adjuster in accordance with one embodiment of the present invention installed in a headlamp assembly.

As shown in FIG. 11, a ball stud 52 extends from the slide 28 passing through the base housing 26 and the assembly support frame 32 and into the headlamp assembly 22. The ball 54 of the ball stud 52 is engaged in a socket (not shown) in the reflector 56 so that axial movement of the ball stud 52 causes movement of the reflector 56. The ball stud 52 is caused to move along its axis by movement of the slide 28 along the channels 34 in the base housing 26. Movement of the slide 28 results from rotation of an adjustment screw 58 that is threaded into the slide 28.

Figure 5A:
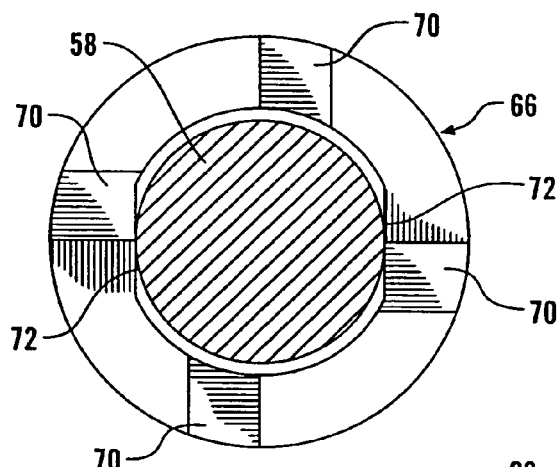
Figure 5B:
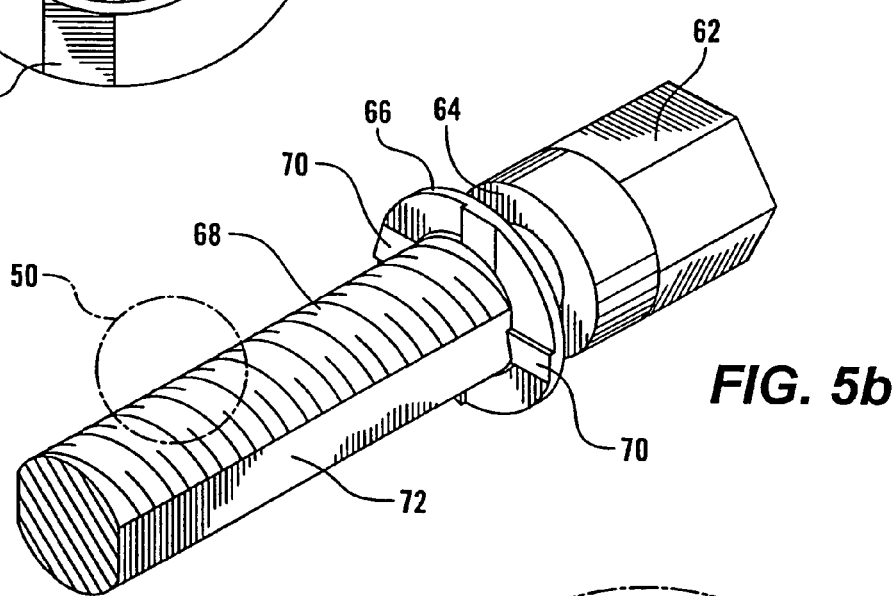
FIG. 5b is a perspective view of a portion of the adjustment screw shown in FIG. 6.

As shown in FIG. 5b, the adjustment screw 58 has a head 62, a narrow neck portion 64, and a threaded portion 68. The adjustment screw 58 is free to rotate and is secured in axial position in the base housing 26 by a screw retainer clip 60 (FIGS. 1 and 2) that snap-fits around the narrow neck portion 64 of the adjustment screw 58. Because the adjustment screw 58 is threaded into the slide 28 but is axially fixed and free to rotate with respect to the base housing 26, when the adjustment screw 58 is rotated it causes movement of the slide 28 with respect to the base housing 26. Thus, rotation of the adjustment screw 58 causes movement of the ball stud 52 with respect to the base housing 26. Because the base housing 26 is fixed to the headlamp assembly support frame 32 and the ball 54 is engaged in a socket in the reflector 56, rotation of the adjusting screw 58 causes changes in the orientation of the reflector 56 within the assembly 22 and the aim of the lamp is thereby adjusted.

Figure 9:
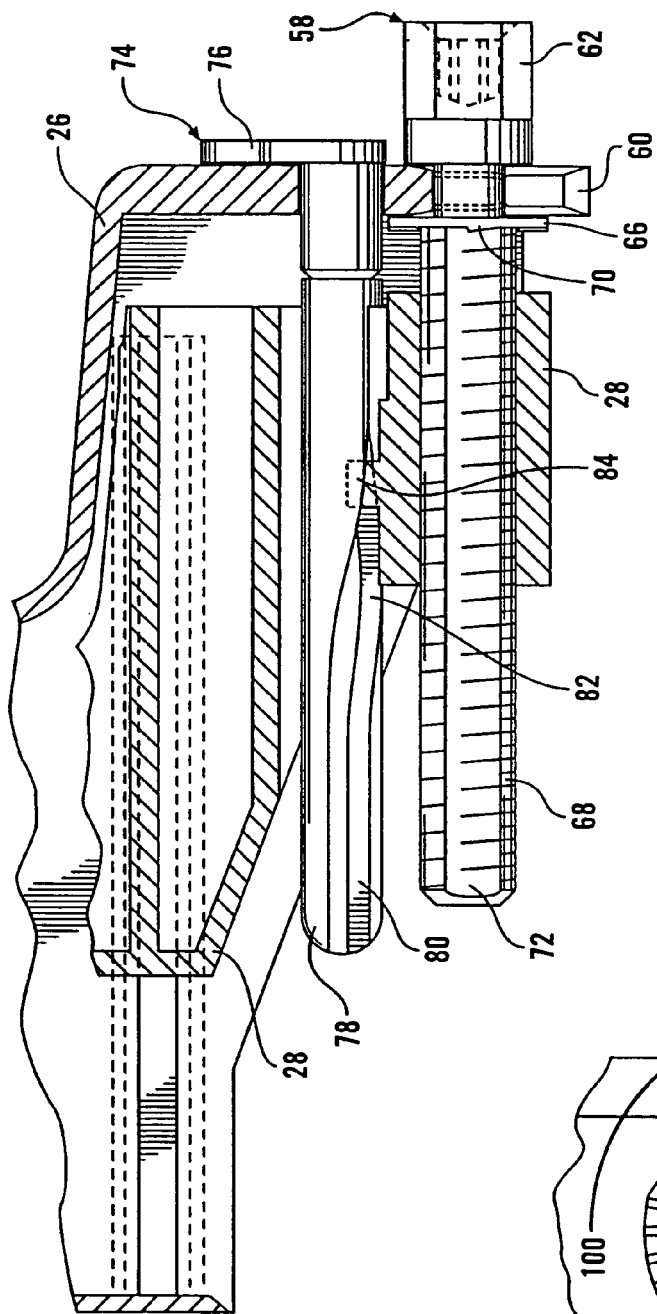
FIG. 9 is another rendering of the cross-section shown in FIG. 6 with the adjustment screw having been rotated such that the slide is in a different position from that shown in FIG. 6.

As shown in FIGS. 5a and 5b, the adjustment screw 58 may include an anti-thread-stripping plate 66 between the narrow neck portion 64 and the threaded portion 68. The anti-thread-stripping plate 66 is a disc-shaped protrusion from the shaft of the adjustment screw 58 that has one or more engagement barbs 70. The purpose of the anti-thread-stripping plate is to reduce the possibility of the threaded portion 66 of the adjustment screw stripping the plastic threads in the slide 28 when an over-adjustment is attempted. As best visualized by referring to FIG. 9, if the adjustment screw 58 is rotated to the point where the slide 28 abuts the anti-thread-stripping plate 66, the engagement barbs 70 project into the end of the slide 28 to prevent further rotation of the adjustment screw 58. Thus, stripping of the threads in the slide 28 in which the adjustment screw 58 is engaged is prevented because the adjustment screw 58 cannot be further rotated. The adjustment screw 58 can be rotated to release the engagement barbs 70 to restore the normal operation of the adjuster 24.

Figure 5C:
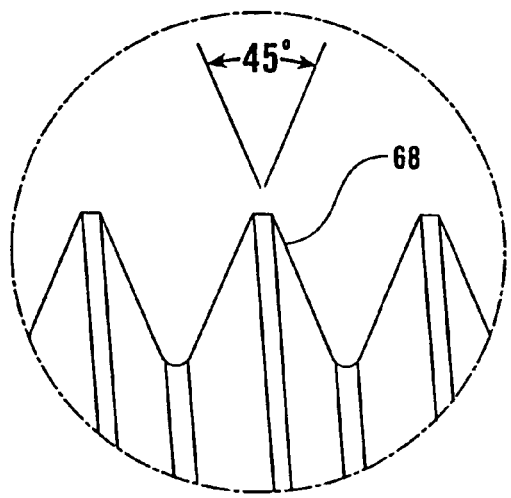
FIG. 5c is a section detail of the threads of the adjustment screw shown in FIG. 5b.

Preferably, the base housing 26 and slide 28 are manufactured from glass-filled nylon using conventional injection molding processes. The ball stud 52 is preferably made from steel and manufactured in a conventional cold-heading process. Due to the possible exposure to harsh elements, manufacturing the adjustment screw 58 from a zinc alloy using a die casting method is preferable to help prevent corrosion and increase durability. As shown in FIGS. 5b and 5c, the threaded portion 68 of the adjustment screw 58 has flattened sides 72 and a forty-five degree thread angle. The flattened sides 72, while facilitating manufacture of the adjustment screw 58 using a die-cast process, are advantageous in that they facilitate a thread-forming initial threading of the adjustment screw 58 into the slide 28. Similarly, the forty-five degree thread angle is advantageous in the thread forming because it requires the displacement of a minimal amount of material while maximizing the strength of the threads in the slide 28. The combined use of a forty-five degree thread angle and flattened sides 72 is helpful in achieving a low drive torque, low prevailing torque, and a resistance to stripping. Of course, other materials and part configurations could be used for particular designs and the description herein of particular materials and configurations should not be deemed to limit the scope of the invention. For example, the ball stud 52 could be manufactured from plastic or a metal other than steel and other plastics or materials could be used to form the base housing 26 and slide 28.

In certain applications, the adjuster 24 must include a VHAD. Preferably, the VHAD used in the sliding adjuster (identified generally as 74) includes an indicator plate 76 with a post 78 extending therefrom. The post 78 includes a groove 80 with a partial helical twist 62 (FIGS. 6 and 9) and is axially fixed (free to rotate) in a snap fit to the base housing 26. A tab 84 jutting from the slide 28 is disposed in the groove 80. The indicator plate 76 is positioned on the base 26 near the adjustment screw 58 such that indicator lines 86 on the plate 76 can be seen by the person adjusting the aim of the lamp. The base housing 26 includes aiming rails 88 behind the plate 76 that, in connection with the indicator lines 86, allow the person making the adjustment to perceive how much of an adjustment has been made. Because the groove 80 includes a partial helical twist 62, as the tab 84 jutting from the slide 28 moves along the groove 80 with movement of the slide 28, the post 78 and indicator plate 76 are caused to rotate. The scale of the movement of the indicator plate 76 with respect to the aiming rails 88 is designed to reflect the corresponding movement of the reflector 56 within the assembly 22. If no VHAD is required, the VHAD 74 is simply not installed in the sliding adjuster 24. While other materials could be used, manufacture of the VHAD 74 from nylon using an injection molding process is preferable.

Figure 12:
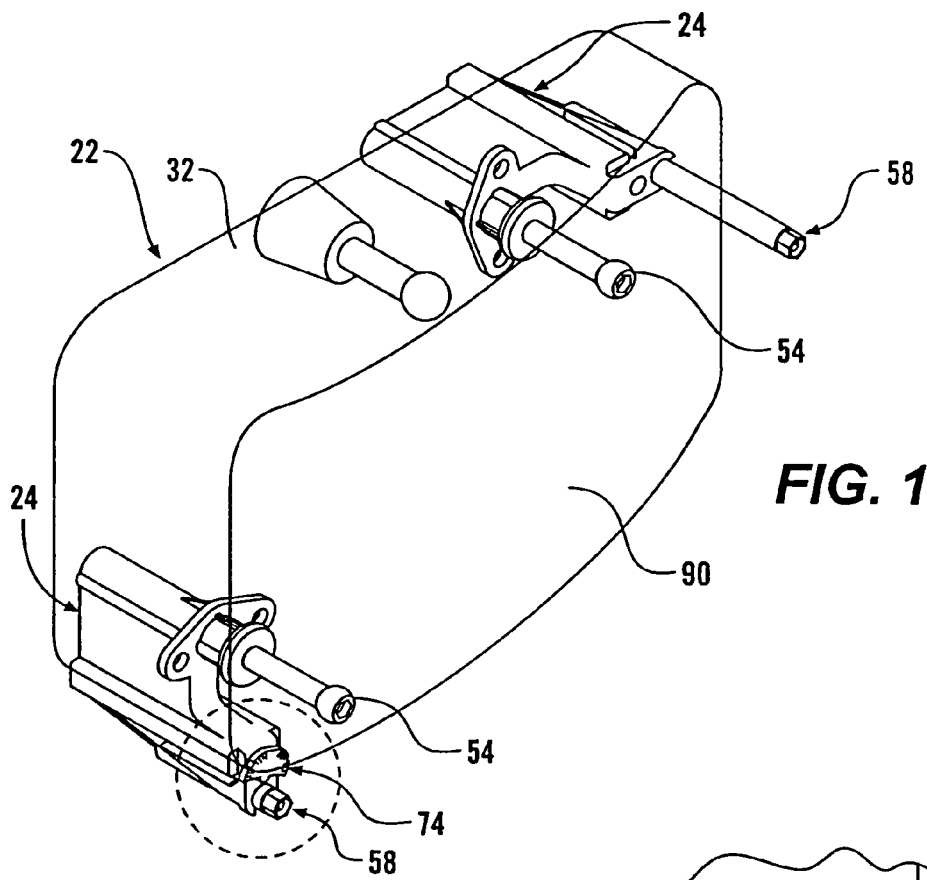
FIG. 12 is a schematic representation of the positioning of sliding headlamp adjusters in accordance with the present invention with respect to a headlamp assembly.
Figure 13:
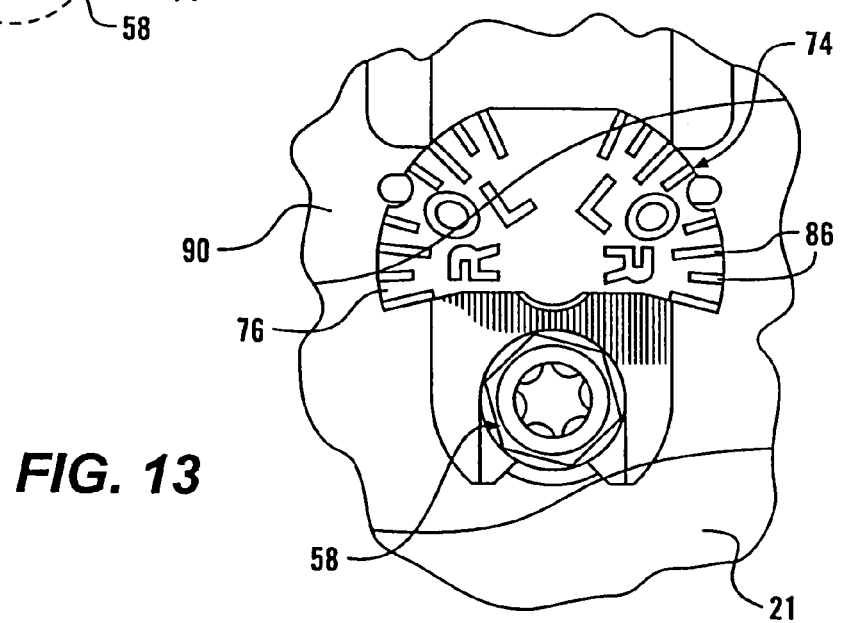
FIG. 13 is a front view of a sliding headlamp adjuster in accordance with one embodiment of the present invention shown in an installed position.
Figure 14:
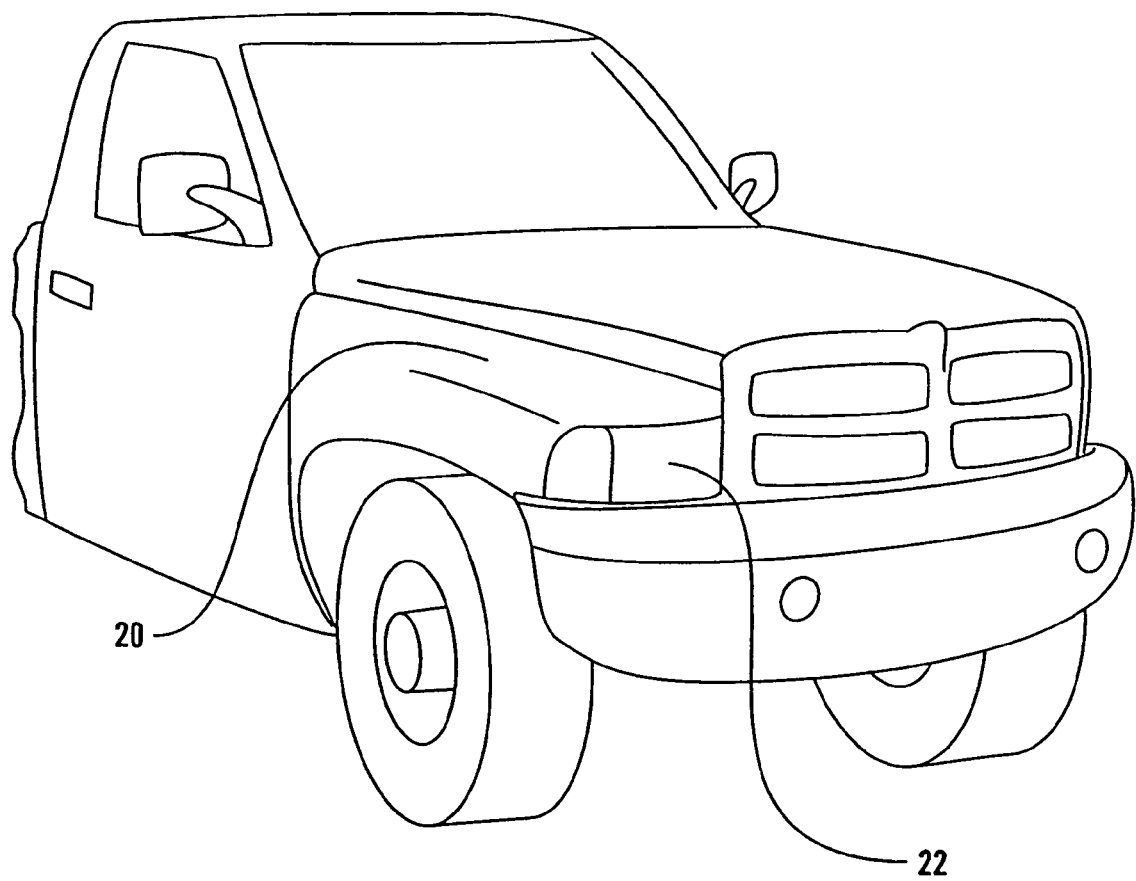
FIG. 14 is a perspective view of a vehicle with which a sliding headlamp adjuster in accordance with the present invention might advantageously be used.

As shown in FIGS. 11, 12 and 13, the sliding headlamp adjuster 24 is installed to the rear of the headlamp assembly 22 using the mounting tabs 30. The ball stud 52 extends into the assembly 22 through the support frame 32 where the ball 54 is disposed in a socket in the reflector 56. An o-ring 57 may be disposed about the ball stud 52 to provide a seal between the shaft of the ball stud 52 and the assembly support frame 32. A lens 90 covers the front of the support frame 32 and protects the reflector 56 and bulb (not shown) from the elements assailing the front of the vehicle. In FIG. 12, the left adjuster 24 controls the horizontal movement of the reflector 56 and is thus equipped with a VHAD 74. The right adjuster 24 controls the vertical movement of the reflector 56 and is not equipped with a VHAD. As shown in detail in FIG. 13, the adjustment screw 58 and VHAD indicator plate 76 are positioned such that they are visible and accessible from the front of the vehicle between the lens 90 and the bumper 21. The indicator plate 76 includes indicator lines 86 that are appropriate for reflecting adjustment when the adjuster is installed on either side of a vehicle. A portion of the indicator plate 76 is covered by the assembly support frame 32 or lens 90 such that the indicator lines 86 that are visible through the gap will properly reflect the adjustment being made. Such a covering of the indicator plate 76 allows the manufacturer to supply one adjuster for installation on both sides of the vehicle. Alternatively, the indicator plate 76 could have indicator lines that are specifically arranged for a particular side of the vehicle.

The operation of the sliding headlamp adjuster 24 to effectuate adjustment of the reflector 56 once installed is quite simple. As shown in FIG. 8 and in detail in FIG. 7, rotation of the adjustment screw 58 in the direction indicated by arrow 92 causes the slide 28 to move toward the head 62 of the adjustment screw 58. This movement of the slide 28 results in the movement of the ball stud 52 in the direction indicated by arrow 94. As the tab 84 that extends from the slide 28 into the groove 80 moves with the slide 28, the tab 84 is caused to move within the groove 80 and along the partial helical twist 82. Movement of the tab 84 along the partial helical twist 82 causes a rotation of the post 78 and indicator plate 76 of the VHAD 74 in the direction indicated by arrow 96. The amount that that the ball stud 52 has moved (and caused adjustment of the reflector 56) is shown by reference to the indicator lines 86 and aiming rails 88.

Figure 10:
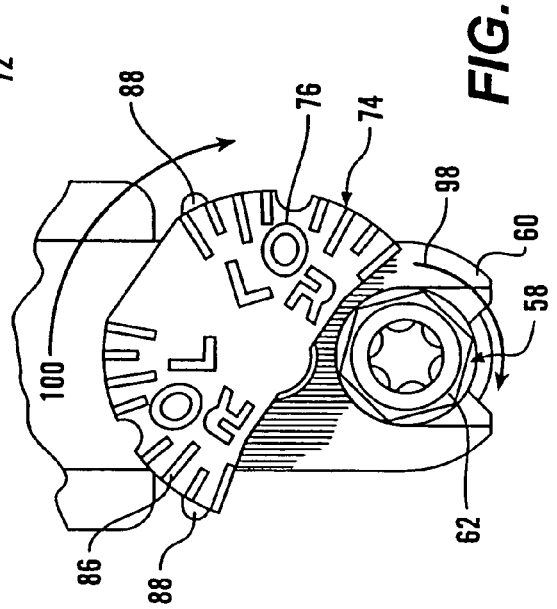
FIG. 10 is partial front view of a sliding headlamp adjuster in accordance with one embodiment of the present invention wherein the adjustment screw is being rotated in the direction of arrow 98 resulting in movement of the VHAD indicator plate in the direction of arrow 100.

Operation of the adjuster 24 to effectuate movement of the ball stud 52 in the opposite direction of that described in the immediately preceding paragraph is shown in FIG. 10. In such operation, the adjustment screw 58 is rotated in the direction indicated by arrow 98 which causes the slide 28 to move away from the head 62 of the adjustment screw 58. This movement of the slide 28 results in the movement of the ball stud 52 in the direction opposite that indicated by arrow 94 in FIG. 8. As the tab 84 that extends from the slide 28 into the groove 80 moves with the slide 28, the tab 84 is caused to move within the groove 80 and along the partial helical twist 82. Movement of the tab 84 along the partial helical twist 82 causes a rotation of the post 78 and indicator plate 76 of the VHAD 74 in the direction indicated by arrow 100. The amount that the ball stud 52 has moved (and caused adjustment of the reflector 56) is shown by reference to the indicator lines 86 and aiming rails 88.

As illustrated by the foregoing description and shown in the Figures, the present invention is more suitable as a headlamp adjuster than are conventional adjusters. The present invention overcomes the limitations and disadvantages of existing adjusters by utilizing an effective design which allows precise control of reflector aim, has smooth operational characteristics, effectively maintains adjustment, can be used where the area behind and above the lamp is inaccessible, and which is cost effective and efficient to manufacture and install.

Although the invention has been herein shown and described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and therefore, the invention is to be taken as including all reasonable equivalents to the subject matter of the appended claims.

I claim:

1. An adjuster comprising:
    a housing having channels;
    a body slidably moveable relative to the housing, wherein the body has guide rails extending therefrom, the body disposed at least partially within the housing with the guide rails engaged in the channels;
    an adjustment screw, wherein the adjustment screw is axially fixed relative to the housing and is threaded to the body, and wherein rotation of the adjustment screw slides the body relative to the housing; and,
    an extension member extending from the body for interacting and imparting movement of the body to a reflector.

2. The adjuster of claim 1 wherein the adjuster further includes a vehicle headlamp aiming device, the VHAD comprising:
    an indicator plate with a post extending therefrom axially fixed relative to the housing, the post having a groove with a partial helical twist along the length thereof; and,
    a tab extending from the body and disposed un the groove such that movement of the body and tab with respect to the housing causes the indicator plate and post to rotate.

3. An adjuster mechanism comprising:
    a frame having a plurality of channels therein;
    a slide having a plurality of rails extending therefrom, the slide at least partially disposed within the frame such that the rails are in sliding engagement in the channels;
    an adjustment screw axially fixed in the frame and threaded into the slide such that rotation of the adjustment screw causes movement of the slide with respect to the frame;
    a reflector positioned relative to the frame; and,
    an extension extending from the slide, the extension engageable in the reflector.

4. The adjuster mechanism of claim 3 further comprising a vehicle headlamp aiming device, the VHAD comprising:
    an indicator plate with a post extending therefrom axially fixed relative to the frame, the post having a groove with a partial twist along the length thereof and,
    a tab extending from the slide and disposed in the groove such that movement of the slid and tab with respect to the frame caused the indicator plate and post to rotate.

5. A headlamp comprising:
    a reflector; and,
    a frame in which the reflector is positioned, wherein the frame has:
        a slide at least partially disposed within the frame and in sliding engagement therewith, the slide including an extension extending internally thereto and engaged to the reflector; and,
        a rotatable adjustment screw axially fixed with respect to the frame and threaded into the slide such that rotation of the adjustment screw causes movement of the slide with respect to the frame.

6. The headlamp of claim 5 further comprising a lens connected to the frame.

7. The headlamp of claim 5 further comprising a light source.

8. A headlamp adjuster comprising:
    a housing, the housing including interior channels along sides thereof;
    a slide having rails extending along exterior sides thereof, the rails at least partially positioned within the interior channels in the housing such that the slide is moveable with respect to the housing along the interior channels of the housing;

an adjustment screw having a thread and a threaded portion, the adjustment screw retained by the housing such that the adjustment screw is free to rotate, the threaded portion of the adjustment screw threaded into the slide such that rotation of the adjustment screw causes movement of the slide with respect to the housing along the interior channels of the housing; and an extension extending from the slide and engaged to a reflector such that movement of the extension causes reorientation of the reflector.

9. The headlamp adjuster of claim 8 further comprising a vehicle headlamp aiming device, the VHAD comprising:

an indicator plate with a post extending therefrom, the post retained by the housing such that post is free to rotate, the post having a groove with at least a partial twist along the length thereof; and, a tab extending from the slide and positioned in the groove such that movement of the slide and tab with respect to the housing causes the post and indicator plate to rotate.

10. A headlamp assembly comprising:

a frame;

a lens at least partially covering a portion of the frame; and a reflector positioned within the frame;

wherein the frame has an adjuster portion, the adjuster portion having:

channels fixed in relation to the frame;

a slide having rails, the rails at least partially positioned within the channels such that the slide is moveable with respect to the body along the interior channels; and, an adjustment screw having a threaded portion, the adjustment screw held fixed in axially position to the frame while being free to rotate, the threaded portion of the adjustment screw threaded into the slide such that rotation of the adjustment screw causes movement of the slide along the interior channels.

11. The headlamp assembly of claim 10 further comprising an extension extending from the slide of the adjuster and connected to the reflector such that movement of the extension causes movement of the reflector.

12. The headlamp assembly of claim 10 where the adjuster portion is located on the exterior of the frame.

13. The headlamp assembly of claim 10 further comprising a vehicle headlamp aiming device, the VHAD comprising:

an indicator plate with a post extending therefrom, the post retained by the body such that the post is free to rotate, the post having a groove with at least a partial twist along the length thereof; and, a tab extending from the slide and positioned in the groove such that movement of the slide and tab with respect to the body causes the post and indicator plate to rotate.

14. An adjuster comprising:

a housing having channels;

a body slidably moveable relative to the housing, the body disposed at least partially within the housing and having guide rails engaged in the channels;

an adjustment screw, wherein the adjustment screw is axially fixed relative to the housing and the adjustment screw is threaded to the body, and wherein rotation of the adjustment screw slides the body relative to the housing; and, an extension member extending from the body for interacting and imparting movement of the body to a reflector.

* * * * *

UNITED STATES PATENT AND TRADEMARK OFFICE
CERTIFICATE OF CORRECTION

PATENT NO. : 6,979,109 B2  Page 1 of 1
DATED : December 27, 2005
INVENTOR(S) : John E. Burton It is certified that error appears in the above-identified patent and that said Letters Patent is hereby corrected as shown below:

<u>Column 8,</u>
Line 24, delete "un" and replace with -- in --.
Line 45, delete "slid" and replace with -- slide --.

Signed and Sealed this

Sixth Day of June, 2006

JON W. DUDAS
*Director of the United States Patent and Trademark Office*